O. B. MUELLER & B. B. HODGMAN.
PIPE FITTING.
APPLICATION FILED MAY 18, 1909.
1,006,260.
Patented Oct. 17, 1911.
2 SHEETS—SHEET 1.
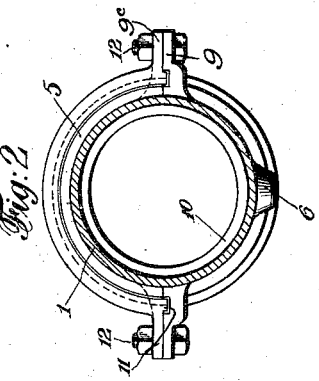
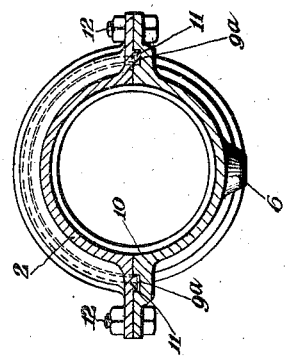
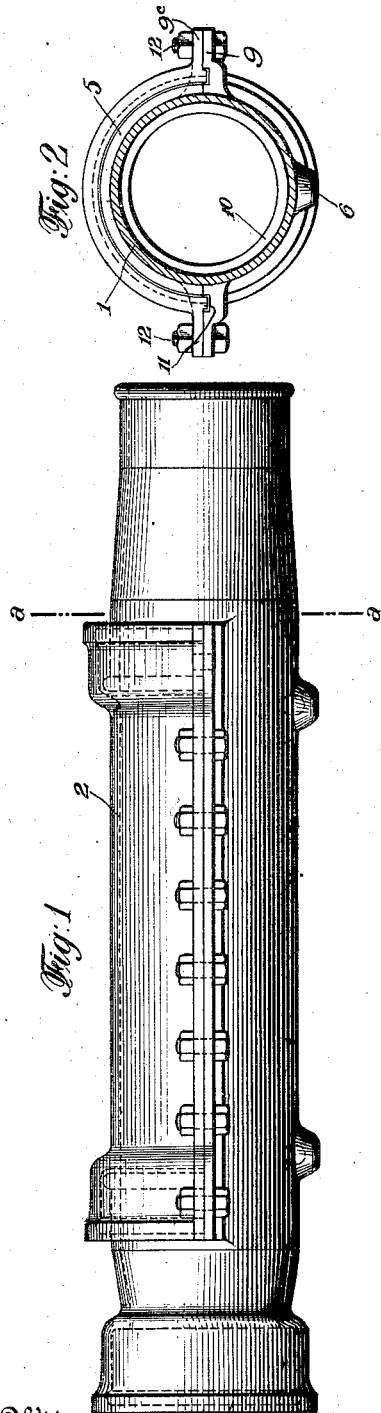
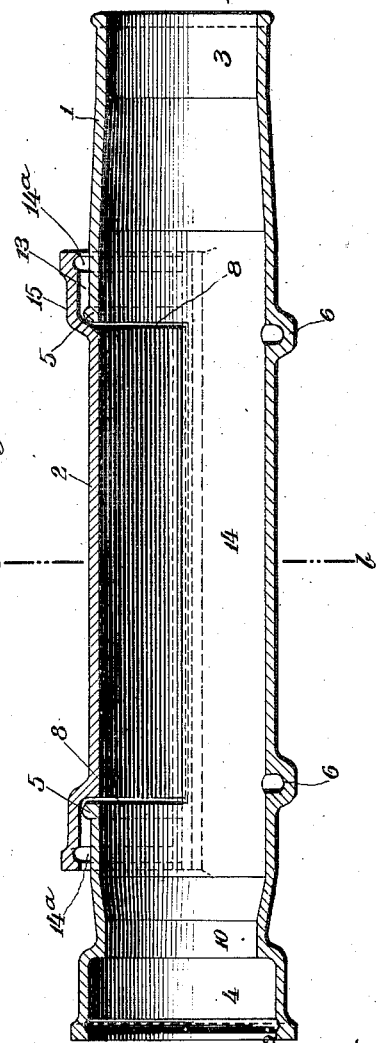
Witnesses:
Inventors
Oscar B. Mueller,
Burt B. Hodgman,
By their Attorneys Kenyon & Kenyon

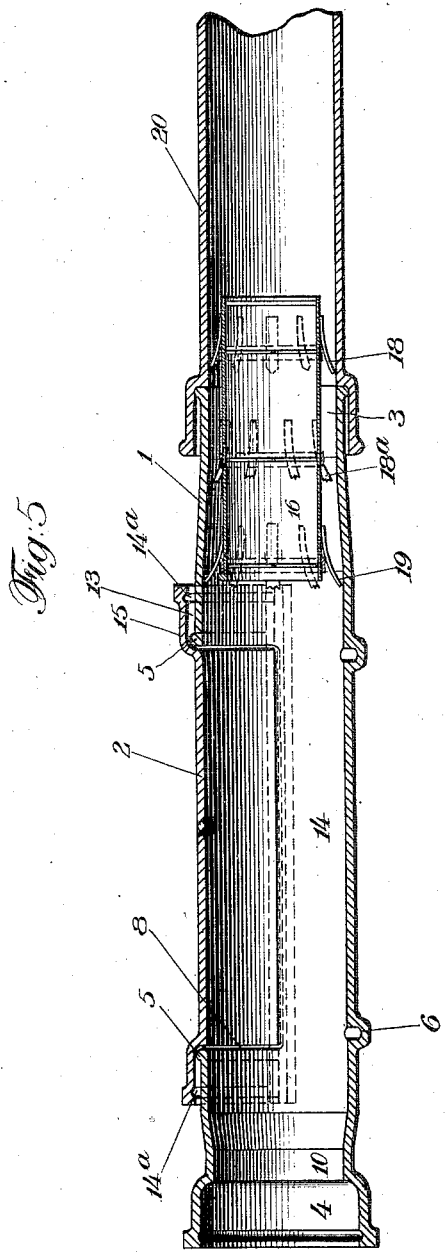

UNITED STATES PATENT OFFICE.

OSCAR B. MUELLER, OF NEW ROCHELLE, NEW YORK, AND BURT B. HODGMAN, OF EAST ORANGE, NEW JERSEY, ASSIGNORS TO NATIONAL WATER MAIN CLEANING COMPANY, A CORPORATION OF MAINE.

PIPE-FITTING.

1,006,260.     Specification of Letters Patent.     Patented Oct. 17, 1911.

Application filed May 18, 1909. Serial No. 496,807.

*To all whom it may concern:*

Be it known that we, OSCAR B. MUELLER and BURT B. HODGMAN, citizens of the United States, and residents, respectively, of New Rochelle, Westchester county, New York, and East Orange, Essex county, New Jersey, have invented certain new and useful Improvements in Pipe-Fittings, of which the following is a specification.

Our invention relates to a pipe fitting particularly adapted for use in pipe lines where access is desirable so that the pipes may be cleaned, and it is particularly adapted for use in water mains where it is desirable to have access to the pipe lines for the purpose of inserting cleaning devices.

A form of our invention is shown in the accompanying drawings in which—

Figure 1 shows the preferred form of our pipe fitting. Fig. 2 is a section taken on the line *a—a* of Fig. 1. Fig. 3 is a sectional view of Fig. 1 taken through the center of the lid or cover. Fig. 4 is a sectional view taken through the line *b—b* of Fig. 2 of a complete fitting. Fig. 5 is a sectional view of our improved pipe fitting showing its adaptability for use as a means for inserting pipe cleaning devices into a pipe line system.

In the drawings 1 represents our pipe fitting having a cover thereon. This fitting may be made a permanent part of the pipe line or may be inserted at any portion of the pipe line by removing another section of pipe if it is desired to have it there temporarily only. At one end the fitting is made bell-shaped as at 4 for the purpose of being placed over the next adjacent section of pipe, while at the other end it is nozzle shaped as at 3 for the purpose of being placed within the bell-shaped portion of the next adjacent section of pipe. Each of the ends of the fitting when placed within a pipe line are yarned and calked in the ordinary way for preventing leakage. We make the greater part of the inner chamber of our fitting larger than the inner chamber of the pipe lines into which it is to be fitted, excepting at the nozzle end 3 where it is of the same diameter as the inner diameter of the pipe line into which it is to be placed and also at the portion marked 10 where it is of the same diameter as at the nozzle end 3. The chamber 14, the inner diameter of which is greater than the inner diameter of the pipe line into which it is placed, is preferably made so that the diameters of the ends of the chamber gradually decrease until they become of the same diameter as the next adjacent section of pipe, thus forming the nozzle end 3 and the nozzle-like portion 10. The object of this being so that when a cleaning device having cleaners of equal or greater diameter than the inner diameter of the pipe to be cleaned is placed within the fitting and is forced forward the gradual decreasing of the inner diameter of the chamber toward its ends compresses the cleaners and thus enables them to pass within the next adjacent section of pipe. The fitting 1 has a cut-out portion 8 through which access may be obtained to the inner part of the pipe line. This cut-out portion 8 is closed by means of a cover 2, which cover has its ends bell-shaped, as at 15, so as to set over the lug 5 and be yarned and calked to prevent leakage in the ordinary way. In each end of this bell-shaped portion of the cover we cut out a recess or groove $14^a$, as shown, so that when the cover is in place the same is to be sealed by pouring in melted lead or other suitable material, which after the recess 13 is filled will flow into groove 14, and thus hold the molten material after it is set in place. The cover 2 has two lugs $9^c$ running lengthwise which when the cover is in place set down upon the lugs 9 projecting from the outer diameter of the fitting 1 and is fastened thereon by suitable bolts 12. We provide the under side of the lugs $9^c$ of the cover 2 with a tongue 11, 11, adapted to set into the groove $9^a$ in the lugs or flanges 9 of the body of the fitting.

In Fig. 5 we have shown our invention in use in connection with water mains, although it can be used in connection with any pipe line in which it is desirable to insert an object having a flexible diameter which is normally of the same or greater size than the bore of the pipe into which the object is to be inserted, showing how the cleaning devices are inserted into the water mains proper. In this Fig. 5, 20 represents the water main proper, 14 represents our improved pipe fitting which has been placed in line with the water main.

16 represents the cleaning device which may be drawn through the water main by the cable or be self-propelled. The cleaning device has cleaning means 18, 18ª and 19. After the cleaning device has been inserted into the chamber and the lid 2 replaced the device passes through the fitting into the pipe line proper, and as it passes from the enlarged chamber of the fitting the cleaners 18, 18ª and 19 are caused to contract toward the center of the pipe by reason of the diameter of the ends of the chamber gradually decreasing until the end of the chamber is of the same size as the inner bore of the water main 20. We have shown in this Fig. 5 the cleaning device at such a point that the cleaners 18 have contracted and lie within the pipe line proper 20, while the cleaners 18ª and 19 are in a position in the end of the chamber 14, so that the cleaners 18ª are being gradually contracted while the cleaners 19 have not as yet begun to contract.

In the drawings we have shown the preferred form of our invention, although many changes might be made without departing from the invention.

What we claim as new and desire to secure by Letters Patent is:

1. In a pipe fitting, an opening therein, a cover for said opening so arranged that when said cover is in position the inner surface of the cover registers with the inner diameter of the fitting, the ends of said cover being bell-shaped and having within the bell-shaped portion a groove, and means for fixedly securing said cover in position.

2. In a pipe fitting, an opening, a cover for said opening so arranged that when said cover is in position the inner surface of the cover registers with the inner diameter of the fitting, a groove in each of the ends only of said cover.

3. In a pipe fitting, an opening therein, a cover for said opening, a groove in said fitting on the sides only, a tongue on said cover, adapted to register with said groove.

4. In a pipe fitting with a chamber, the inner circumference of the end thereof gradually decreasing until it is of the same circumference as the inner circumference of the next adjacent section of the pipe line and same being so constructed that any circumference in said fitting will be concentric with the circumference of the chamber.

5. In a pipe fitting, a device adapted to clean water pipes a chamber, concentric with the next adjacent section of the pipe line, the inner diameter of which gradually decreases until it is of the same diameter as the inner diameter of the next adjacent section of the pipe line, said device adapted to be placed within said chamber, the diameter of said device being capable of being decreased.

6. In a pipe fitting, the combination of a chamber, the circumference of which is concentric with the circumference of the ends of the pipe, the inner circumference of the end of said chamber gradually decreasing until it is of the same circumference as the end of the pipe.

7. In a pipe fitting, an enlarged chamber, an end of which gradually decreases in size until it is of the same diameter as the next adjacent section of pipe, all so constructed that all diameters taken at any given cross section of said fitting will be the same.

8. In a pipe fitting, an enlarged chamber, the ends of which gradually decrease in size until they are of the same diameter as the next adjacent section of pipe, all so constructed that all diameters taken at any given cross section of said fitting will be the same.

9. In a pipe fitting the combination of a chamber, a cross-section of a portion of said chamber so constructed that any diameter of said cross-section is greater than the diameter of the adjacent sections of the pipe line, the ends of said chamber gradually decreasing in size, until they are of the same diameter as the inner diameter of the pipe line.

In testimony whereof, we have signed our names to this specification, in the presence of two subscribing witnesses.

OSCAR B. MUELLER.
BURT B. HODGMAN.

Witnesses:
CLINTON INGLEE,
JOS. L. PIERCE.